Nov. 28, 1961  T. F. ARONSON ET AL  3,010,211
AREA COUNTING MEANS FOR ROLL MATERIAL
Original Filed Jan. 6, 1958
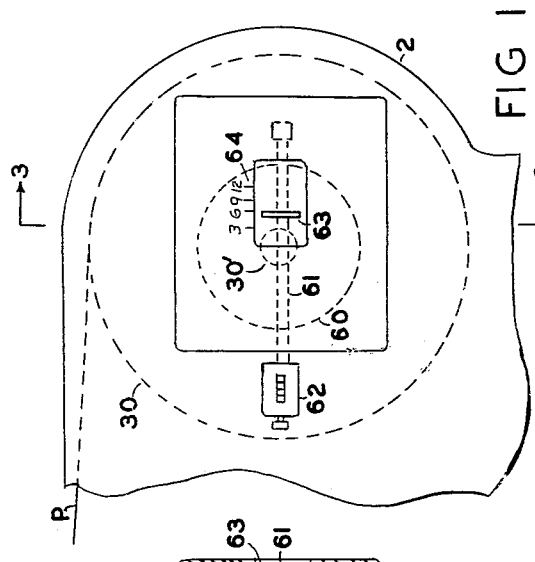
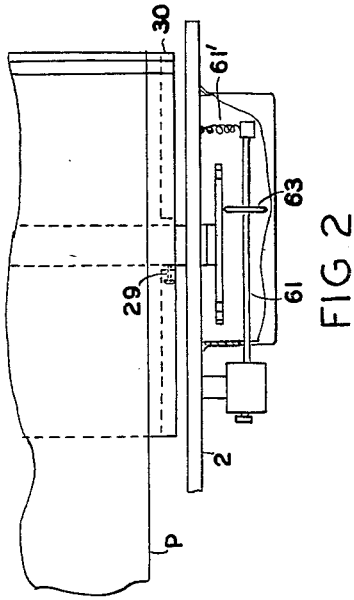
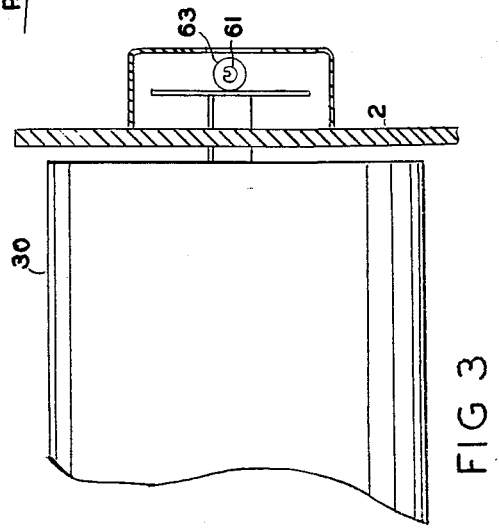
*INVENTORS*
THEODORE F. ARONSON
FLOYD A. LYON

United States Patent Office 3,010,211
Patented Nov. 28, 1961

3,010,211
AREA COUNTING MEANS FOR ROLL MATERIAL
Theodore F. Aronson, Glen Cove, and Floyd A. Lyon, Brookville, N.Y., assignors to Viewlex, Inc., Long Island City, N.Y., a corporation of New York
Original application Jan. 6, 1958, Ser. No. 707,276, now Patent No. 2,949,839, dated Aug. 23, 1960. Divided and this application Oct. 1, 1958, Ser. No. 764,719
2 Claims. (Cl. 33—133)

This invention relates to area counting means for roll material for instance in the developing and drying photographic paper or web of the type used in oscillographic recording cameras.

This application is a division of our prior copending application S.N. 707,276, filed January 6, 1958, for Processor for Photographic Paper, now Patent No. 2,949,839, granted August 23, 1960.

The photographic paper which is processed by that invention normally comes in rolls of about 250 feet in length and 10 or 12 inches in width. Conventional apparatus generally comprises a paper magazine, a series of baths, namely developing, stopping, and fixing or stabilizing baths. Separate tanks are provided for each bath and all tanks are set in a large temperature controlled bath. Rollers are provided to guide the paper through the baths, and a heated drying drum is provided. Temperature controls are provided for the bath and the drum.

The present invention is a square footage indicator to measure the use of the chemicals which automatically indicates the number of square feet passed through the chemical baths. A linear footage indicator is not satisfactory as the rolls have different widths.

Accordingly, a principal object of the invention is to provide new and improved web handling means including square footage counting means.

Another object of the invention is to provide new and improved measuring means comprising square footage counting means for roll material.

FIGURE 1 is a side view of an embodiment of the invention.

FIGURE 2 is a plan view partially in section of the embodiment of FIGURE 1.

FIGURE 3 is a detailed view partially in section along line 3—3 in FIGURE 1.

Referring to the figures, the web or paper P is led around the large drum 30 which is rotatably mounted in the frame 2 by means of the shaft 30', to which it is fixed by set screw 29.

It is important to count the square footage of the paper being processed since the chemicals wear out according to the film area developed. Linear footage measurement is not sufficient since various width rolls of film or paper may be used in sequence. The square footage counter generally comprises a disc 60, FIGURE 1, which is fixedly mounted to the drum 30 shaft 30'. A mechanical revolution counter 62 is fixedly mounted on the outer casing 2 and is connected to a keyed shaft 61. A friction wheel 63 is slidably and non rotatably mounted on the keyed shaft 61, and the shaft 61 is spring loaded by the spring 61' so that the wheel bears against the disc 60. The wheel is adapted to be moved along the shaft 61 and is set in position against a calibrated scale 64 which is calibrated according to the width of the paper roller. Therefore, for paper of greater width, the wheel is set on scale 64 toward the outside of the disc 60 and will provide more revolutions of the shaft 61 so that the counter 62 will actually indicate square footage of paper processed since the chemicals were changed.

We claim:

1. A square footage counter for roll material handling apparatus comprising a material roller fixedly mounted on a rotatable shaft, a disc fixedly mounted on one end of said shaft, a longitudinally keyed shaft mounted perpendicular to the axis of said disc and spring loaded toward said disc, a friction wheel slidably mounted on and keyed to said keyed shaft for rotation therewith and adapted to contact said disc, calibrated means for adjusting said wheel on said keyed shaft, said calibrated means corresponding to the width of roll material on said roll handling apparatus, and a rotation counter mounted on the end of said keyed shaft.

2. An area counter for roll material handling apparatus comprising a material handling roller fixedly mounted on a rotatable shaft, a disc fixedly mounted on one end of said shaft, a second shaft mounted perpendicular to the axis of said disc, a friction wheel slidably mounted on and connected for rotation with said second shaft and adapted to contact said disc, calibrated means for adjusting said wheel on said second shaft, said calibrated means corresponding to the width of a roll of material on said handling apparatus, and a rotation counter mounted on the end of said second shaft, whereby said counter gives readings in square feet.

References Cited in the file of this patent

UNITED STATES PATENTS 920,803    Woodruff _____ May 4, 1909

FOREIGN PATENTS 195,615    Great Britain _____ Dec. 20, 1923